United States Patent [19]

Nakamura et al.

[11] 4,125,036
[45] Nov. 14, 1978

[54] APPARATUS FOR DRIVING ENGINE BALANCERS

[75] Inventors: Hirokazu Nakamura; Hikoichi Motoyama, both of Kyoto, Japan

[73] Assignee: Mitsubishi Jidosha Kogyo Kabushiki Kaisha, Japan

[21] Appl. No.: 802,305

[22] Filed: Jun. 1, 1977

Related U.S. Application Data

[62] Division of Ser. No. 614,163, Sep. 17, 1975, Pat. No. 4,074,589.

[30] Foreign Application Priority Data

Oct. 16, 1974 [JP] Japan ............................. 49-119778

[51] Int. Cl.² ......................................... F16F 15/10
[52] U.S. Cl. ................................. 74/604; 123/192 B; 123/195 A
[58] Field of Search ............ 123/192 B, 195 A, 90.27, 123/90.31; 74/604, 226, 229

[56] References Cited

U.S. PATENT DOCUMENTS

| | | | |
|---|---|---|---|
| 2,010,056 | 8/1935 | Brush | 74/604 |
| 2,914,963 | 1/1959 | Scherenberg | 74/604 |
| 3,473,399 | 10/1969 | Buchwald | 74/226 |
| 3,613,645 | 10/1971 | Froumajou | 123/195 A |
| 3,808,912 | 5/1974 | Voorhees | 74/604 |
| 4,074,589 | 2/1978 | Nakamura | 74/604 |

FOREIGN PATENT DOCUMENTS

1,106,744 12/1955 France ................................. 123/192 B
1,935,121 1/1971 Fed. Rep. of Germany.

*Primary Examiner*—Benjamin W. Wyche
*Assistant Examiner*—R. C. Turner
*Attorney, Agent, or Firm*—Robert E. Burns; Emmanuel J. Lobato; Bruce L. Adams

[57] ABSTRACT

An apparatus for driving a pair of balancers disposed on both sides of an engine, parallel to the crankshaft, and driven rotationally in opposite directions at a speed twice the rotating speed of the crankshaft by the motive power of the crankshaft. An elongate endless member engages rotors, one fitted on each balancer, on a cam shaft, and on the crankshaft. The internal side of the endless member engages with the rotor on one of the balancers. The external side of the endless member engages with the rotor on the other balancer to drive the two balancers reversely to each other without employing any particular reversing mechanism.

2 Claims, 3 Drawing Figures

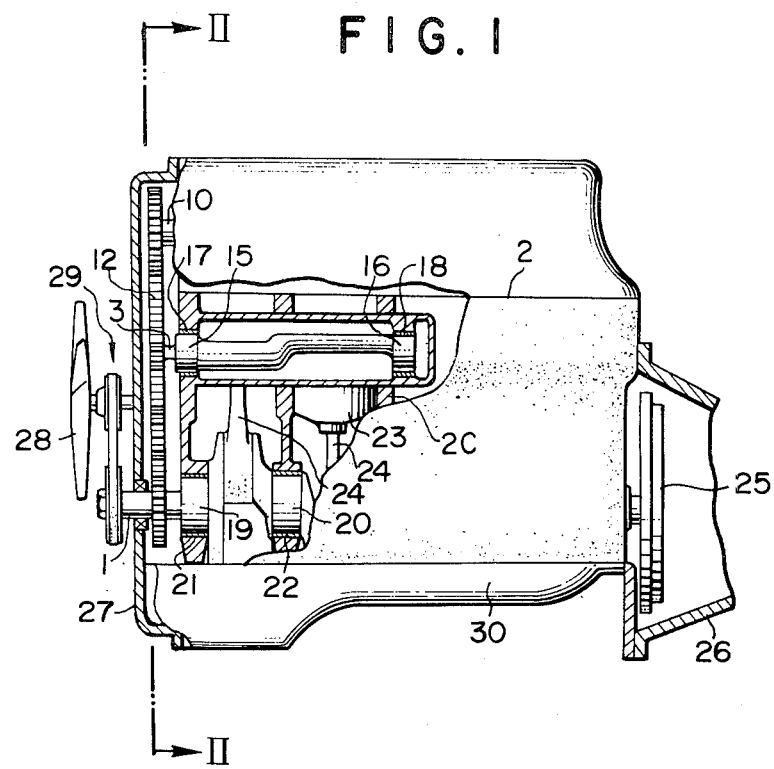
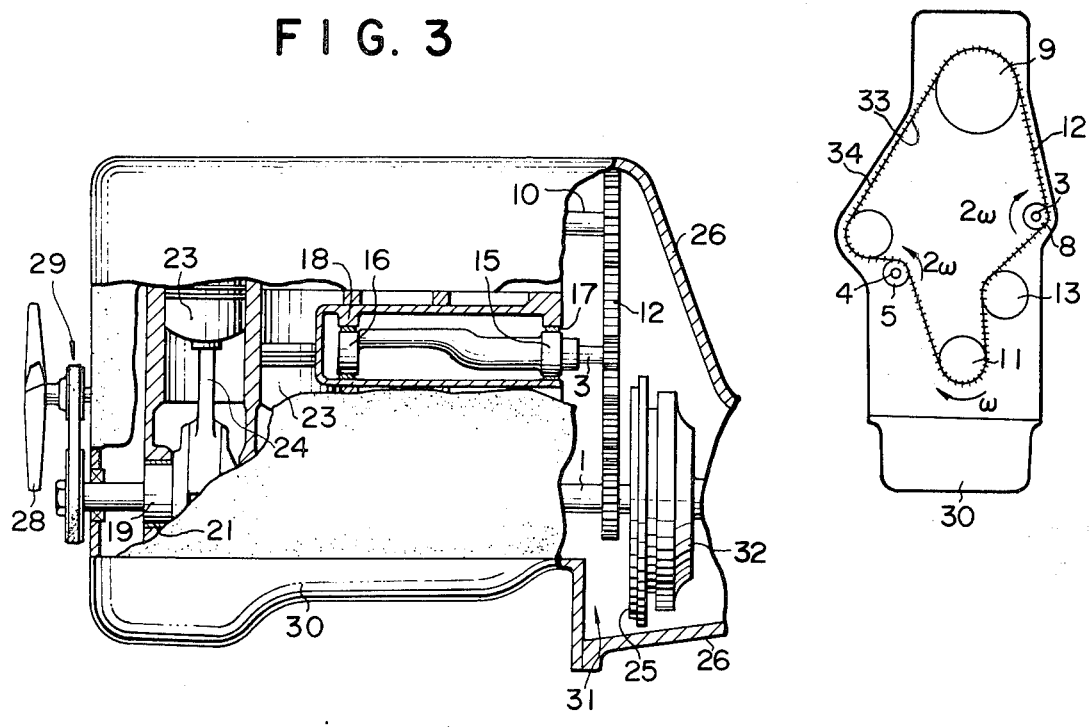

APPARATUS FOR DRIVING ENGINE BALANCERS

This is a divisional, of application Ser. No. 614,163, filed Sept. 17, 1975, now U.S. Pat. No. 4,074,589.

BACKGROUND OF THE INVENTION

This invention relates to improvements in apparatus for driving engine balancers.

For a conventional in-line four cylinder engine, various means to eliminate vertical secondary vibromotive force so as to prevent the vibration of the engine have been proposed. But no apparatus has been available that eliminates secondary vibromotive momentum due to reciprocating mass and vibromotive momentum due to explosion torque. In order to obviate this disadvantage, the present applicant proposed an invention for which a patent is being applied under U.S. patent application Ser. No. 527,780 filed Nov. 27, 1974. Now this invention further improves the balancer driving mechanism proposed in the aforesaid prior pending application.

In an engine of the conventional type, as is commonly known, balancer driving mechanism is provided in the front part thereof, separate from timing gears for the camshaft. In addition, water pump, cooling fan and driving mechanisms such as a dynamo are arranged in tandem along the axis of the crankshaft. This not only increases the entire length of the engine, but also makes its assembly and maintenance complex since so many components as mentioned above are placed in a very small space.

SUMMARY OF THE INVENTION

This invention is proposed to eliminate the aforementioned shortcomings. More particularly, the primary feature of this invention lies in an apparatus for a driving engine balancer mechanism in which at least a pair of balancers are disposed on lines that are on both sides of, at desired distances, and substantially parallel to the axis of the crank shaft. In this driving mechanism, the pair of balancers are at distance from each other with respect to the axis of the cylinders, and are so designed as to rotate opposite to each other, at a speed twice the rotating speed of the crank shaft. As shown herein a single elongate endless member, such as a timing chain, disposed in the front or rear part of the cylinder block, engages with rotors fitted on each balancer, a cam shaft and the crankshaft. And the internal side of the elongate endless member engages with the rotor on one of the pair of balancers, and the external side of the elongate endless member engages with the rotor on the other balancer in order to drive the pair of balancers reversely each other without employing any particular reversing mechanism.

BRIEF DESCRIPTION OF THE DRAWINGS

Now this invention will be described in detail with reference to the accompanying drawings, in which:

FIG. 1 is a schematic view of an embodiment of this invention, with an end part thereof cut open.

FIG. 2 is a view taken with certain parts removed and as seen in the direction of arrow II—II in FIG. 1.

FIG. 3 is a schematic view showing another application of this invention, with a part thereof cut.

DESCRIPTION OF THE PREFERRED EMBODIMENTS

Referring first to FIGS. 1 and 2, an embodiment of this invention will be described in detail.

A crank shaft 1 is fitted in a cylinder block 2. At least a pair of balancer shafts 3 and 4 are disposed on lines that are on both sides of, at desired distances, and substantially parallel to the axis of the crank shaft 1. The pair of balancer shafts 3 and 4 are spaced at a distance for each other with respect to the axis of the cylinders 2c in block 2, and are so designed as to rotate opposite to each other, at a speed $2\omega$ twice the rotating speed $\omega$ of the crank shaft 1, as illustrated in FIGS. 1 and 2.

Item 5 is a belt pulley fitted to the balancer shaft 4. Reference numeral 8 denotes a belt pulley fitted to balancer shaft 3, while item 9 is a belt pulley fitted to a camshaft 10 and 11 is a belt pulley fitted to crank shaft 1. Item 12 is a timing belt engaged with belt pulleys 5, 8, 9 and 11 and a tensioner 13.

As shown in FIG. 2, the internal indentations 33 of the timing belt 12 are engaged with the belt pulley 8 on one of the pair of balancer shafts 3, while the external indentations 34 thereof are engaged with the belt pulley 5 on the other balancer shaft 4, whereby the balancer shafts 3 and 4 and the cam shaft 9 are driven by the motive power of the crankshaft 1. Journals 19 and 20 of the crank shaft 1 are supported in bearings 21 and 22, respectively. A piston 23 in cylinder 2c is fitted to the end of a connecting rod 24 supported by the crank shaft 1. Reference numeral 25 designates a flywheel, 26 a bell housing, and 27 a timing gear case fitted in the front part of the cylinder block 2. Item 28 is a cooling fan operated by a belt driving mechanism 29 connected with the crank shaft 1, and 30 an oil pan.

In the embodiment of this invention thus composed, the balancer shafts 3 and 4 are driven, when the engine operates, by the single timing belt 12 through the belt pulleys 5, 8, 9 and 11. This dispenses with the need of providing separate driving mechanisms for the camshaft and the balancers, it is thereby in contrast to the conventional apparatus. Accordingly, the apparatus of this invention can be placed compactly in a small space in the front part of the engine, thus reducing its manufacturing cost and increasing its maintainability. Further, it can eliminate secondary vibromotive force and momentum due to reciprocating mass and explosion torque simultaneously and remarkably. As is evident from above, this invention offers excellent operations and results. Furthermore, the balancer shafts 3 and 4 are rotated in opposite directions by a single timing belt, without employing any particular reversing mechanism. This lowers manufacturing cost, simplifies the structure of the balancer driving mechanism, and reduces occurrence of troubles. As also shown in FIG. 2, the balance shaft pulleys 5, 8 are one-half as large as the crankshaft pulley 11, while the cam shaft pulley 9 is larger. Thus the balance shafts are rotated by the crankshaft, through the timing belt, at twice the speed of crankshaft rotation.

Now an example in which the above-described embodiment of this invention is applied will be described with reference to FIG. 3 wherein parts similar to those in FIGS. 1 and 2 are designated by similar reference numerals.

In this example, the balancer driving mechanism of this invention is placed in the rear part 31 of the cylinder block, whereas this mechanism was provided in the front part thereof in FIGS. 1 and 2. The arrangement of FIG. 3 necessitates only expanding the bell housing 26 upwards for enclosing a clutch 32 and the timing belt 12 as shown in FIG. 3, while the timing gear case 27 of the first embodiment is no longer necessary. Therefore, the conventional foreward extension of the engine, in the longitudinal direction of the crank shaft and for separate driving mechanisms for the cam shaft and the balancers, can be reduced, as in the first embodiment of this invention. Also, maintainability of the engine is improved because only the cooling fan and some auxiliary components such as the dynamo (not shown) are provided in the front part of the engine.

Instead of the timing belt used in the above-mentioned example, other endless timing members such as a sprocket-driven chain may be used. Also, the same operations and results can be obtained when this invention is used for a horizontal engine.

What is claimed is:

1. A cylinder and piston engine, comprising;
   a cylinder block;
   a crankshaft disposed therein and having cylinder and piston means for rotating it at a crankshaft speed;
   a cam shaft for timing intake and exhaust operations in the cylinder means; and
   a balancer system for balancing vibromotive forces acting on the cylinder block on operation of the piston means, the system comprising first and second balancer shafts laterally spaced from the crankshaft on two sides of that shaft and disposed substantially parallel thereto, and a timing mechanism disposed at an end of the cylinder block and driven by the crankshaft for driving the balancer shafts and also the cam shaft, the timing mechanism comprising a single elongate endless member operatively connected with the several shafts to drive the first and second balancer shafts in directions opposite to one another, both at a speed equal to twice the crankshaft speed, the endless member having two mutually opposite sides thereof and the shafts having rotors rigidly fitted therein for the operative connection of the endless member with the shafts, the rotor of the first balancer shaft being engaged with one of the sides of the endless member, and the rotor of the second balancer shaft being engaged with the other side of the endless member to effect the rotating of the balancer shafts in opposite directions.

2. An engine according to claim 1 in which the rotors are belt pulleys and the elongate endless member is a timing belt having the two mutually opposite sides thereof engageable with the belt pulleys.

* * * * *